(12) United States Patent
Blanco Varela et al.

(10) Patent No.: US 11,485,109 B2
(45) Date of Patent: Nov. 1, 2022

(54) PANELS FOR A CABIN OF AN AIRCRAFT

(71) Applicants: AIRBUS OPERATIONS GMBH, Hamburg (DE); AIRBUS OPERATIONS, S.L.U., Madrid (ES)

(72) Inventors: Tamara Blanco Varela, Madrid (ES); Peter Linde, Hamburg (DE)

(73) Assignees: AIRBUS OPERATIONS GMBH, Hamburg (DE); AIRBUS OPERATIONS, S.L.U., Madrid (ES)

( * ) Notice: Subject to any disclaimer, the term of this patent is extended or adjusted under 35 U.S.C. 154(b) by 391 days.

(21) Appl. No.: 16/838,507

(22) Filed: Apr. 2, 2020

(65) Prior Publication Data
US 2020/0317341 A1 Oct. 8, 2020

(30) Foreign Application Priority Data

Apr. 2, 2019 (EP) .................................... 19382241

(51) Int. Cl.
*B64D 11/00* (2006.01)
*H01M 10/0525* (2010.01)
(Continued)

(52) U.S. Cl.
CPC .................. *B32B 5/02* (2013.01); *B32B 5/04* (2013.01); *B32B 5/18* (2013.01); *B32B 5/22* (2013.01); *B32B 5/24* (2013.01); *B32B 5/245* (2013.01); *B64C 1/066* (2013.01); *H01M 4/587* (2013.01); *H01M 10/0413* (2013.01); *H01M 10/0525* (2013.01); *H01M 10/48* (2013.01); *B32B 5/022* (2013.01); *B32B 2250/03* (2013.01);
(Continued)

(58) Field of Classification Search
None
See application file for complete search history.

(56) References Cited

U.S. PATENT DOCUMENTS

| 4,050,208 | A |   | 9/1977 | Pompei et al. |
| 5,700,337 | A | * | 12/1997 | Jacobs ...................... B32B 7/12 |
|  |  |  |  | 156/298 |

(Continued)

FOREIGN PATENT DOCUMENTS

| CN | 104037405 A | * | 9/2014 | ........ H01M 10/0525 |
| DE | 10028693 A1 | * | 12/2001 | ............. B29C 53/04 |

(Continued)

OTHER PUBLICATIONS

Jaques et al., Expansion of carbon fibres induced by lithium intercalation for structural electrode applications, Aug. 2013, Carbon, vol. 59, pp. 246-254 (Year: 2013).*

(Continued)

*Primary Examiner* — Jeffrey A Vonch
(74) *Attorney, Agent, or Firm* — Nixon & Vanderhye P.C.

(57) ABSTRACT

A panel (1000) for a cabin of an aircraft, the panel (1000) including a laminate (150) with a first layer formed of lithiated carbon fibers (100), a second layer form of carbon fibers with a cathode lithium coating (200), and an electrolyte-containing separator (300) interposed between the first and the second layers and a pressure sensor (50*a*, 50*b*) on an outer surface of the laminate (150), and a switch (40) to regulate a voltage to the laminate (150) based on an output of the pressure sensor (50*a*, 50*b*) so that the panel (1000) expands.

18 Claims, 5 Drawing Sheets

(51) Int. Cl.
| | |
|---|---|
| *H01M 10/36* | (2010.01) |
| *B32B 5/02* | (2006.01) |
| *B32B 5/04* | (2006.01) |
| *B32B 5/22* | (2006.01) |
| *B32B 5/24* | (2006.01) |
| *B64C 1/06* | (2006.01) |
| *B32B 5/18* | (2006.01) |
| *H01M 4/587* | (2010.01) |
| *H01M 10/48* | (2006.01) |
| *H01M 10/04* | (2006.01) |
| *H01M 4/02* | (2006.01) |
| *B64C 1/18* | (2006.01) |
| *B64F 5/00* | (2017.01) |
| *B64C 1/00* | (2006.01) |

(52) U.S. Cl.
CPC ....... *B32B 2250/04* (2013.01); *B32B 2250/40* (2013.01); *B32B 2255/02* (2013.01); *B32B 2255/20* (2013.01); *B32B 2260/021* (2013.01); *B32B 2260/04* (2013.01); *B32B 2262/106* (2013.01); *B32B 2305/07* (2013.01); *B32B 2305/20* (2013.01); *B32B 2307/20* (2013.01); *B32B 2307/50* (2013.01); *B32B 2307/732* (2013.01); *B32B 2457/10* (2013.01); *B32B 2605/003* (2013.01); *B32B 2605/18* (2013.01); *B64C 1/068* (2013.01); *B64C 1/18* (2013.01); *B64C 2001/0072* (2013.01); *B64D 11/00* (2013.01); *B64D 11/003* (2013.01); *B64D 2011/0046* (2013.01); *B64F 5/00* (2013.01); *H01M 10/36* (2013.01); *H01M 2004/021* (2013.01); *H01M 2220/20* (2013.01); *Y10S 428/913* (2013.01); *Y10T 428/24132* (2015.01); *Y10T 428/30* (2015.01); *Y10T 442/2418* (2015.04); *Y10T 442/2984* (2015.04); *Y10T 442/645* (2015.04)

(56) References Cited

U.S. PATENT DOCUMENTS

| | | | | |
|---|---|---|---|---|
| 6,988,304 | B2 * | 1/2006 | Moseley | C09K 5/063 |
| | | | | 29/458 |
| 7,349,225 | B1 * | 3/2008 | Bennett | H05K 1/144 |
| | | | | 174/250 |
| 8,951,623 | B2 | 2/2015 | Hoetzeldt | |
| 2005/0175894 | A1 | 8/2005 | Visco et al. | |
| 2006/0102786 | A1 * | 5/2006 | Granzeier | B60R 13/06 |
| | | | | 244/119 |
| 2008/0261116 | A1 * | 10/2008 | Burton | C23C 16/24 |
| | | | | 427/113 |
| 2008/0282636 | A1 * | 11/2008 | Roth | B64C 1/066 |
| | | | | 52/506.01 |
| 2009/0250554 | A1 * | 10/2009 | Graeber | B64C 1/06 |
| | | | | 244/119 |
| 2010/0176242 | A1 * | 7/2010 | Bock | B64C 1/066 |
| | | | | 244/131 |
| 2011/0310556 | A1 * | 12/2011 | Schmid | B64D 11/00 |
| | | | | 361/688 |
| 2012/0214040 | A1 * | 8/2012 | Tsutsumi | H01M 4/1391 |
| | | | | 156/182 |
| 2013/0048785 | A1 * | 2/2013 | Grosse-Plankerman | |
| | | | | B64C 1/18 |
| | | | | 244/119 |
| 2014/0196831 | A1 | 7/2014 | Ayres et al. | |
| 2015/0013265 | A1 * | 1/2015 | Castanha | B60R 13/0206 |
| | | | | 52/716.6 |
| 2015/0180028 | A1 * | 6/2015 | Asp | H01M 4/583 |
| | | | | 429/306 |
| 2015/0232165 | A1 * | 8/2015 | Staudigel | B64C 1/066 |
| | | | | 244/119 |
| 2015/0342050 | A1 * | 11/2015 | Jiang | H05K 1/148 |
| | | | | 361/749 |
| 2016/0146349 | A1 * | 5/2016 | Le Lay | B64C 1/066 |
| | | | | 156/60 |
| 2017/0043855 | A1 * | 2/2017 | Malek | B64D 11/0023 |
| 2017/0050533 | A1 * | 2/2017 | Wei | H01G 11/04 |
| 2017/0274974 | A1 * | 9/2017 | Hegenbart | H01R 43/205 |
| 2017/0349297 | A1 * | 12/2017 | Linde | H01M 4/583 |
| 2018/0015705 | A1 * | 1/2018 | Linde | B32B 27/12 |
| 2018/0040912 | A1 * | 2/2018 | Chang | H01M 50/116 |
| 2018/0108827 | A1 * | 4/2018 | Hakkens | H01L 41/0471 |
| 2018/0118323 | A1 * | 5/2018 | Ischdonat | B32B 37/14 |
| 2018/0194917 | A1 * | 7/2018 | Dikeman | B29C 65/18 |
| 2018/0254404 | A1 * | 9/2018 | Ubachs | H01L 41/193 |
| 2019/0092488 | A1 * | 3/2019 | Veto | B64D 27/24 |
| 2019/0181452 | A1 * | 6/2019 | Linde | H01M 50/437 |
| 2019/0210320 | A1 * | 7/2019 | Fette | B29C 70/46 |
| 2019/0263498 | A1 * | 8/2019 | Bernasconi | B64C 39/02 |
| 2019/0331627 | A1 * | 10/2019 | Linde | G01M 5/0033 |
| 2020/0198800 | A1 * | 6/2020 | Linde | B32B 7/025 |
| 2020/0223524 | A1 * | 7/2020 | Massarelli | B64C 1/40 |
| 2020/0247531 | A1 * | 8/2020 | Storm | B64D 15/163 |

FOREIGN PATENT DOCUMENTS

| | | | |
|---|---|---|---|
| DE | 102019103978 A1 * | 8/2020 | |
| EP | 3124375 A1 * | 2/2017 | |
| WO | WO-2005093285 A1 * | 10/2005 | B64C 1/066 |

OTHER PUBLICATIONS

Ihrner et al., Structural lithium ion battery electrolytes via reaction induced phase-separation, Nov. 2017, Journal of Materials Chemistry A, vol. 5, pp. 25652-25659 (Year: 2017).*

Hagberg et al., Lithium iron phosphate coated carbon fiber electrodes for structural lithium ion batteries, Jul. 2018, Composites Science and Technology, vol. 162, pp. 235-243 (Year: 2018).*

Xu et al., Carbon fiber composites with battery function: Stresses and dimensional changes due to Li-ion diffusion, Jan. 2018, Journal of Composite Materials, vol. 52, Issue 20 (Year: 2018).*

Xu et al., Multiphysics modeling of mechanical and electrochemical phenomena in structural composites for energy storage: Single carbon fiber micro-battery, Mar. 2018, Journal of Reinforced Plastics and Composites, vol. 37, Issue 10 (Year: 2018).*

Thomas et al., Flexure and pressure-loading effects on the performance of structure-battery composite beams, Nov. 2018, Journal of Composite Materials, vol. 53, Issue 20 (Year: 2018).*

Carlstedt et al., Effects of state of charge on elastic properties of 3D structural battery composites, May 2019, Composites Science and Technology, vol. 169, pp. 26-33 (Year: 2019).*

Johannisson et al., Shape-morphing carbon fiber composite using electrochemical actuation, Mar. 2020, vol. 117, No. 14, pp. 7658-7664 (Year: 2020).*

Search Report for EP19382241, dated Sep. 23, 2019, 2 pages.

* cited by examiner

PANELS FOR A CABIN OF AN AIRCRAFT

RELATED APPLICATION

This application claims priority to European Patent Application Number 19382241.8, filed Apr. 2, 2019, the entirety of which is incorporated by reference.

TECHNICAL FIELD

The present invention refers to panel structures for a cabin of an aircraft. Particularly, the present invention may be embodied to provide adjustable panels for a cabin of an aircraft that automatically fill gaps based on the piezo-chemo-electric properties of lithiated carbon fibres and a related method for filling gaps between panel cabins.

BACKGROUND OF THE INVENTION

Aircraft cabins are equipped with panels to cover elements as insulation components, ducts and electrical wiring. The panels, referred to as "linings" are often built in sandwich design, with a foam or honeycomb core that may include covers of carbon fiber reinforced polymer GRFP or CFRP. Due to geometry, temperature, and installation, the joints between two adjacent panels may often display a visible gap as shown in FIG. 1 of the present disclosure. FIG. 1 comprises a left panel (1), a right panel (2) and a gap in a joint (3) between the left panel (1) and the right panel (2).

Furthermore, FIG. 2 shows an example of a joint (12) in the cabin of an aircraft. FIG. 2 shows the joint (12) between a hat rack (10) and crown lining (20). Similar joints can be seen between lining panels, between lining panels and divider walls, between lining panels and monuments, etc. Due to several reasons as e.g. optics (poor design), acoustical reasons and risk for vibration, it is not desirable to let the gaps in joints. Conventionally, it is attempted to close the joints by altering positioning of the cabin panels or by filling the gap with "gap fillers".

Hence, there is a need for finding a solution that avoids these undesirable gaps and that would not require e.g. altering the positioning of the cabin panels and/or using gap fillers as previously mentioned. The present invention aims to solve this problem.

SUMMARY

Electrochemical cells store electricity as a result of spontaneous chemical reactions occurring inside. They consist of two half cells joined by a salt bridge. A lithium ion cell consists of two dissimilar electrodes, separated from each other by an electrolyte which is an ionic conductor and electronic insulator. The free energy associated with the transfer of electrons around an external circuit and lithium ions "li-ions" between two intercalation electrodes in the cell is related to the difference in the chemical potential of lithium in the two electrodes.

Lithium battery cells comprises three main components. First, the anode which on discharge gives up electrons to the external circuit and is oxidized during the electrochemical reaction. Most commercial cells currently employ a carbon/graphite based electrode as anode. Second, the cathode which on discharge accepts electrons from the external circuit and is reduced during the electrochemical reaction. It is usually a transition metallic oxide or phosphate. Third, the electrolyte (an ionic conductor but electronic insulator) which separates the two electrodes and provides the medium for charge transfer inside the cell between the anode and cathode. The electrolyte is typically a non-aqueous inorganic solvent containing a dissolved lithium salt, e.g. $LiPF_6$ in propylene carbonate.

On charge state of the cell, the positive electrode, the cathode is oxidized, li-ions are de-intercalated from the layered lithium intercalation host, pass across the electrolyte and are intercalated between the graphite layers by an electrochemical reduction reaction at the negative electrode. Intercalation consist of the reversible insertion of a guest atom into a solid host structure without inducing a major disruption of the host material.

An example of a lithium battery cells is the lithium iron phosphate (LiFePO) battery, also called LFP battery (with "LFP" standing for "lithium ferrophosphate"), is a type of rechargeable battery, specifically a lithium-ion battery, which uses LiFePO as a cathode material, and a graphitic carbon electrode with a metallic current collector grid as the anode.

FIG. 3 shows an electro chemical LiFePO cell comprising carbon fiber (100) with li-ions attached (anode), a cathode as e.g. carbon (200) with a cathode coating of LiFePO4, a separator (300) that permits li-ions to pass through and that blocks electrons and electrolyte (400) that can be liquid or solid and the li-ions (500).

It has been discovered that a lithiated carbon fibre (e.g. carbon with LiFePO4) obtains piezo-chemo-electric properties. Lithiation is defined as the incorporation of lithium into an electrode in a lithium-ion battery. FIG. 4 shows the piezo-chemo-electric effect of the lithiated carbon fibre (100). The graphic in FIG. 4 shows OCP (open circuit potential) and force, both plotted versus time. It can be seen that the change of potential follows a change in force (i.e. strain) achieving a piezo-chemo electric effect for the carbon fibre direction.

It was also discovered that carbon fibre may increase in diameter and therefore they can "swell" as shown in FIG. 5, a lithiated carbon fibre upon increased potential to counter electrode having a basic state diameter (100) and a "swelled" diameter (101).

Hence, the present invention may be embodied to provide adjustable panels for a cabin of an aircraft that automatically fill gaps based on the aforementioned piezo-chemo-electric properties of the lithiated carbon fibres and a related method for filling gaps between panel cabins.

This is achieved by providing panels that integrate layers of carbon fibres that can be lithiated by means of counter electrodes. The counter or auxiliary electrode provides means of applying input potential to the working electrode, i.e. the carbon fibers. As long as a gap to the neighbouring panel (i.e. a gap between two joint panels) is detected by a pressure sensor, the panel's lithiated carbon fibre layers can be made to expand, by controlling the potential to counter electrode, until the gap has been closed. At the same time the charged panel can function as an energy storage battery. Thus the proposed panels for a cabin of an aircraft comprising lithiated carbon fibres are multifunctional, they achieve a structural functionality, gap filling functionality, and energy storage functionality as the expanding fibres can at the same time store energy. Hence, closing the joints in the cabin by altering positioning of the cabin panels or by filling the gaps with "gap fillers" is avoided with the proposed panel. Furthermore, automatic gap control and filling permits to continuously correct effects of temperature, pressure, etc.

Hence, a first aspect of the present invention is a panel for a cabin of an aircraft, the panel comprising at least one laminate comprising at least a first layer comprising lithiated carbon fibers, a second layer comprising carbon fibers with a cathode lithium coating and an electrolyte-containing separator interposed between the first and the second layers. In some examples, the panel can comprise an upper laminate having two layers of lithiated carbon fibers, two separators and a single layer comprising carbon fibers shared between two adjacent laminates. Furthermore, the same panel can comprise a lower laminate having five layers as in the upper laminate.

The panel can comprise one or more sensors, such as pressure sensors or other contact sensors, established on an outer surface of the laminate. Furthermore, the panel comprises a switch to regulate the applied voltage to the laminate. In this regard, the sensors are configured to provide an output used by the switch. This output may indicate the detection of a gap in a joint between the panel and another cabin element. Hence, the switch may regulate voltage to the laminate based on the output from the sensor. This applied voltage may cause the panel to expand so that the panel can fill the gap. The panel further comprises a microcontroller integrated with the switch and that actuates the switch based on the reception of the output signal from the sensor. The panel further comprises a power source that provides the applied voltage to the laminate. In some examples, the voltage source is not comprised in the panel. In other examples, the voltage source is a further panel according to the present invention.

In some examples, the cathode lithium coating can comprise LiFePO4. The panel can further comprise a foam sandwiched between a first laminate and a second laminate.

Further aspects of the present invention relate to a hat-rack for an aircraft comprising the proposed panel and a cabin lining comprising the proposed panel. It is indicated that the proposed panel can be integrated into any element of the aircraft cabin for the purpose of gap filling and/or energy storage.

In another aspect of the present invention, it is proposed a method for filing a gap between a two-panel joint comprising a panel according to the first aspect of the present invention and a cabin element of an aircraft, the first panel comprises a laminate comprising a first layer of lithiated carbon fibers, a second layer of carbon fibers with a cathode lithium coating and an electrolyte-containing separator established between the first and the second layers, the method comprises detecting a gap between the panel and the cabin element with a pressure sensor and applying a voltage to the laminate based on an output of the pressure sensor, this applied voltage causes the lithiated carbon fibers of the first layer and the panel to expand. This expansion makes the panel to fill the gap. The voltage applied to the laminate can be regulated with a switch.

The method further comprises a step for detecting a contact between the panel and the cabin element with the pressure sensor after the filling of the gap with the panel and terminate the applied voltage to the laminate by actuating the switch based on the output from the pressure sensor. The switch can be actuated with a microcontroller integrated with the switch in the panel and configured to receive the output from the pressure sensor. The pressure sensor can be e.g. a piezoelectric sensor. The output of the pressure sensor may be an output voltage wherein e.g. a low voltage indicates the detection of a gap in the joint between the proposed panel and the cabin element and a high voltage indicates the detection of a contact between the panel and the cabin element in response to a mechanical stress suffered by the pressure sensor during the contact.

The method, further comprises using a battery as an energy storage to apply the voltage to the laminate in the panel or using a further panel according to the present invention as an energy storage to apply the voltage to the laminate. As previously mentioned, the laminate is an electro chemical cell that can be used to store energy. The method, further comprises locating or orientating the lithiated carbon fibers of the laminate parallel to the two-panel joint and/or locating the lithiated carbon fibers of the laminate perpendicular to the two-panel joint. Any distribution of the fibers can be used in order to cause the expansion of the panel in longitudinal or transversal direction with respect to the joint.

BRIEF DESCRIPTION OF THE DRAWINGS

For a better understanding the above explanation and for the sole purpose of providing an example, some non-limiting drawings are included that schematically depict a practical embodiment.

DETAILED DESCRIPTION OF AN
EMBODIMENT OF THE INVENTION

Figure 6:
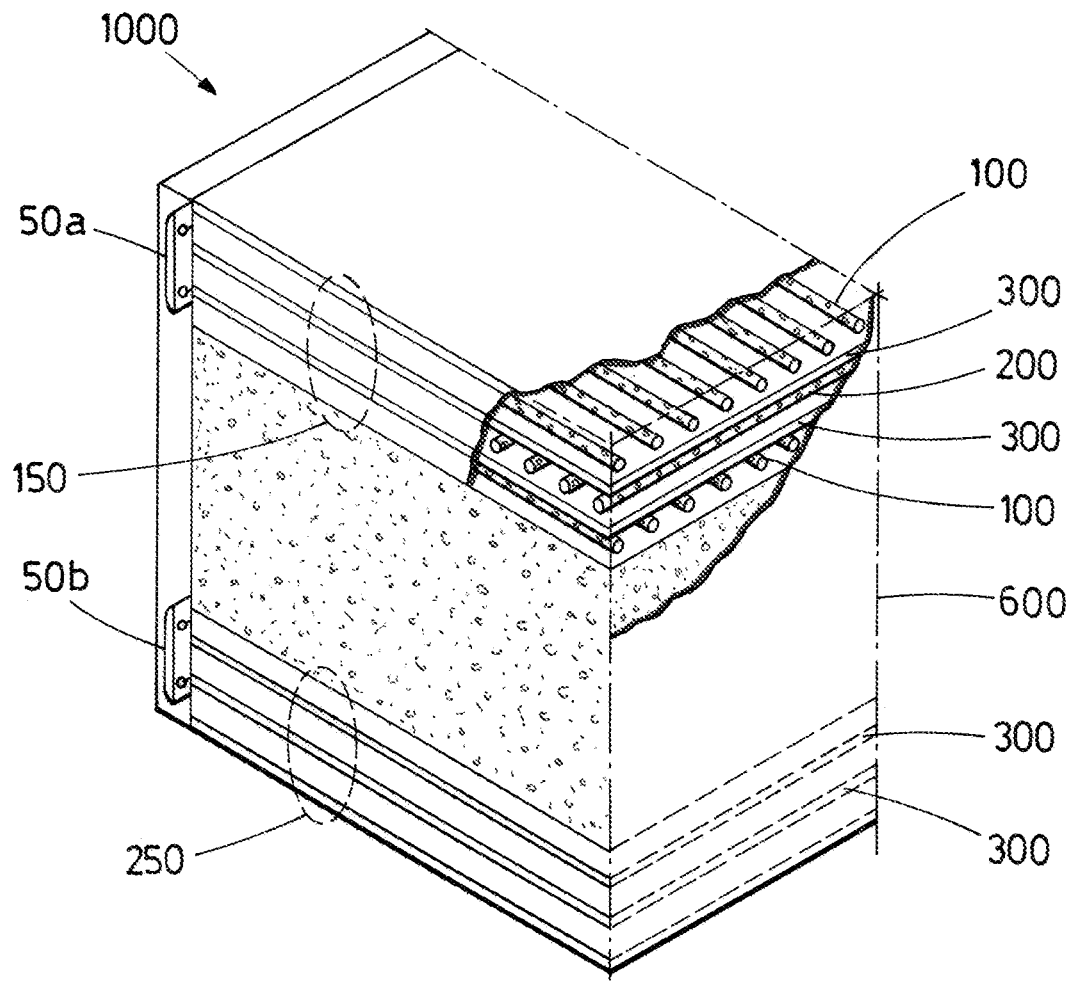
FIG. 6 shows a panel for a cabin of an aircraft according to the present invention.

FIG. 6 shows an example of a panel (1000) for a cabin of an aircraft according to the present invention. The panel (1000) comprises a first laminate (150) and a second laminate (250). The first and the second laminates (150, 250) each comprises from the top to the bottom of the of the panel (1000) a first layer that comprises lithiated carbon fibers (100) an electrolyte-containing separator (300) and a second layer comprising carbon fibers with a cathode lithium coating (200). The electrolyte-containing separator (300) is interposed between the first and the second layers.

Laminates (150, 250) further comprise a second electrolyte-containing separator (300) and a second layer comprising carbon fibers with a cathode lithium coating (200). Hence, a single layer carbon fibers with a cathode lithium coating (200) is used as counter electrode for two layers comprising lithiated carbon fibers (100) in the laminate (150). Analogously, a single second layer with carbon fibers with cathode lithium coating is used as counter electrode for two layers comprising lithiated carbon fibers in the laminate (250). Other laminate configurations with different number of layers can be considered for the panel (1000).

Furthermore, a foam (600) is sandwiched between the first laminate (150) and the second laminate (250) forming the panel (1000) that can be used as e.g. a crown lining FIG. 6 shows the lithiated carbon fibers (100) oriented longitudinally to a joint (12) (not shown in the figure).

Furthermore, the panel (1000) comprises two pressure sensors (50a, 50b) established on an outer surface of the first laminate and second laminates (150, 250) respectively. The pressures sensors (50a, 50b) are established in a joint (12) between the panel (1000) and a cabin element of the aircraft. The pressure sensors (50a, 50b) can be configured to detect a gap in the joint (12). The pressure sensor (50a) can detect a gap in the panel (1000) with respect to the laminate (150). The pressure sensor (50b) can detect a gap in the panel (1000) with respect to the laminate (250). If the first and/or the second pressure sensors (50a, 50b) detect a gap, a switch (40) is actuated in the closed position based on the output of the pressure sensors (50a, 50b) and a voltage to the respective laminate (150, 250) is applied. This applied voltage causes the lithiated carbon fibers (100) of the first layers to expand by li-ions intercalation in the fibers. This expansion of the first layers in the laminates (150, 250) causes the panel (1000) to expand and fill the gap between the panel (1000) and cabin element.

The panel (1000) can be integrated into cabin lining, into a hat-rack or into any other cabin element of the aircraft.

Figure 7A:
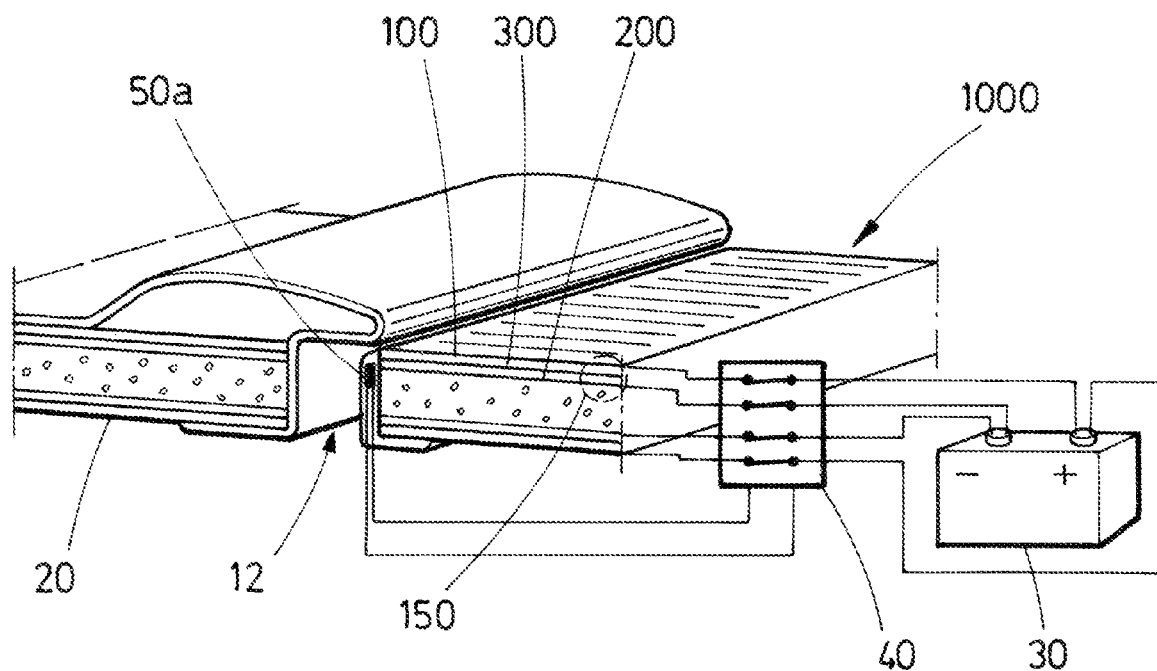
FIG. 7A shows a panel for a cabin of an aircraft according to the present invention during an expansion stage.

FIG. 7A shows the panel (1000) according to the present invention during an expansion stage of the panel (1000) upon detection of a gap in a joint (12) by the pressure sensor (50a). Additionally to the elements shown in FIG. 6. In FIG. 7A, a power source (30) is shown connected to the switch (40) that regulates the voltage applied to the laminate (150) of the panel (1000). Upon detection of a gap between the panel (1000) and the crown lining (20) by the pressure sensor (50a), a first voltage value, e.g. a "gap signal" is sent from the pressure sensor (50a) to a microcontroller integrated with the switch (40). This signal may indicate the existence of a gap between cabin elements of the aircraft. The switch (40) can be actuated by the microcontroller to a closed position that allows the current to pass between the power source (30) and the laminate (150). An applied voltage causes the lithiated carbon fibres (100) in the layer to expand by li-ions intercalation based on a redox reaction between the first and second layers of the laminate (150). The expansion of the lithiated carbon fibres (100) makes the panel (1000) to expand and fill the gap.

In the described situation, the power source (30) acts like a charging battery since there is a higher voltage between its electrodes than in the "composite battery" formed by the laminate, so that the power source charges the "composite battery" rising its voltage, as long as hooked up, until the composite battery max has reached its own voltage. However, when the pressure sensor (50a) reports a too large stress (the panel is too expanded and needs to be "shortened"), the "composite battery" should be discharged. In one embodiment, an energy consumption device can be hooked up to the laminate to force the voltage drop. Alternatively, the power source (30) may comprise variable resistors with a lower voltage adjusted therein than the voltage in the "composite battery".

Figure 7B:
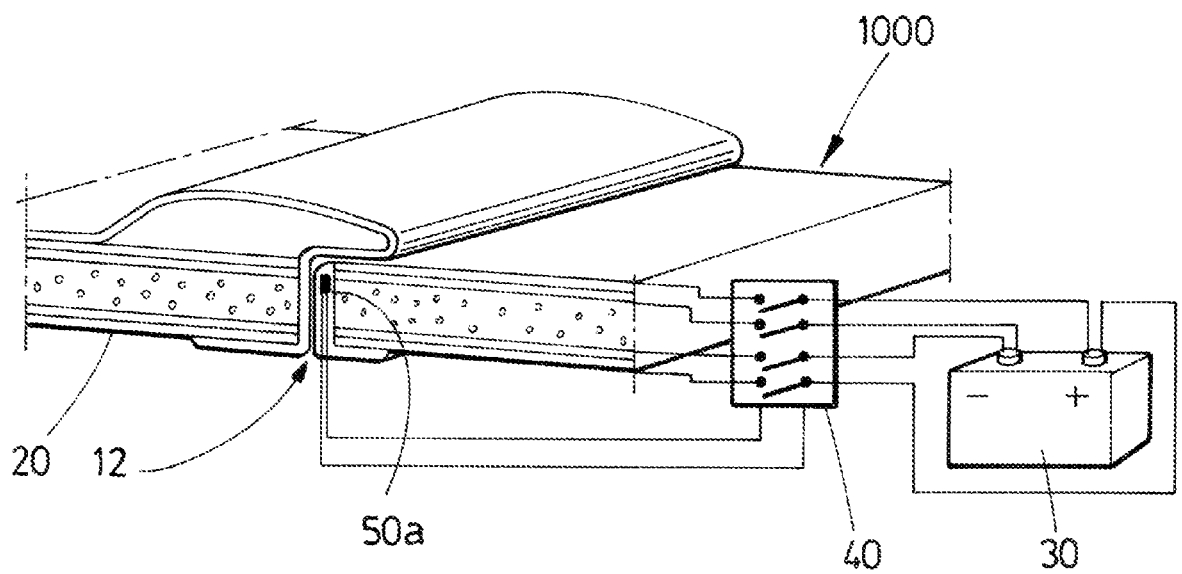
FIG. 7B shows a panel for a cabin of an aircraft according to the present invention after the expansion stage.

FIG. 7B shows the panel (1000) after the expansion stage shown in FIG. 7A. At some point during the expansion of the panel (1000) caused by connecting the laminate (150) to the power source (30), the pressure sensor enters into contact with the surface of the crown lining (20), this contact triggers a second voltage value, e.g. a "contact signal" that prompts the microcontroller in the switch (40) to actuate the switch to an open position where current flow between the panel (1000) and the power source (30) is interrupted as shown in the figure. At this stage, the carbon fibres (100) stop expanding as the applied voltage ceases as the gap is already filled as shown in the figure.

Figure 1:
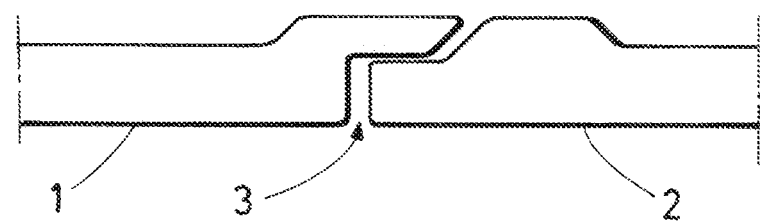
FIG. 1 shows a joint between two adjacent panels in a cabin of an aircraft.
Figure 2:
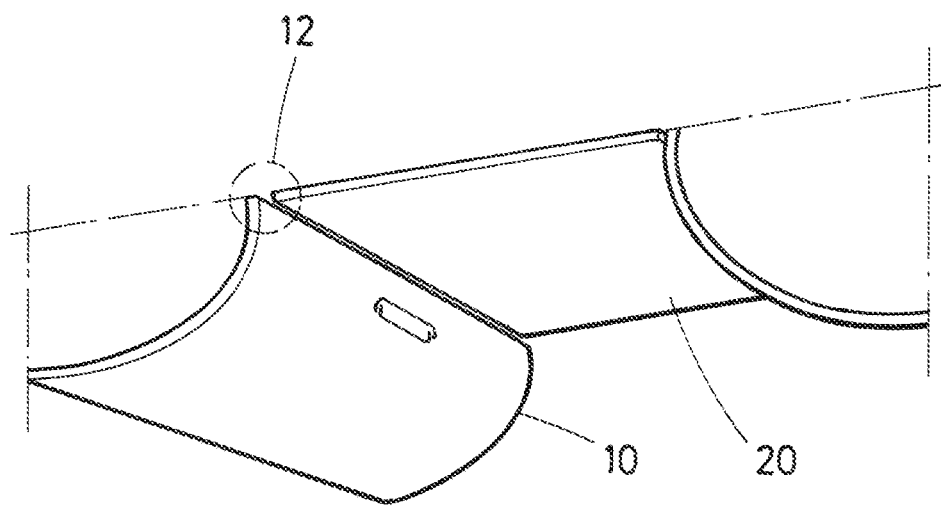
FIG. 2 shows a joint between a hat rack and crown lining in a cabin of an aircraft.
Figure 3:
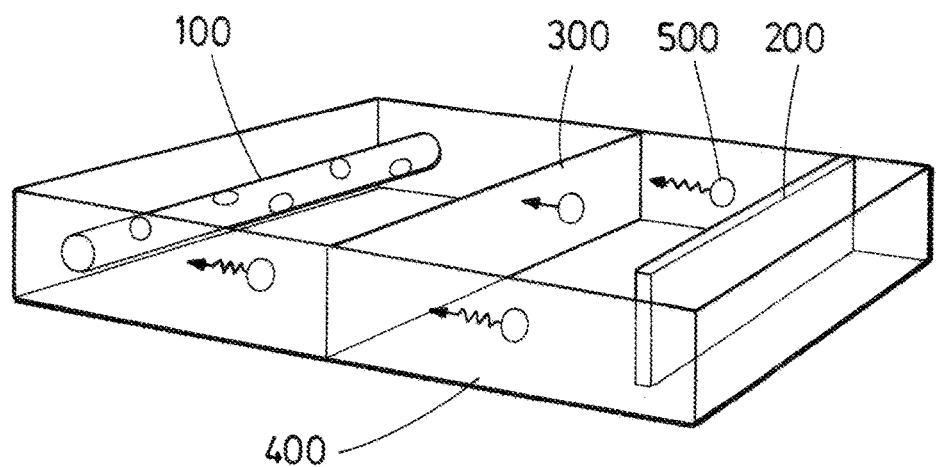
FIG. 3 shows an electro chemical LiFePO cell.
Figure 4:
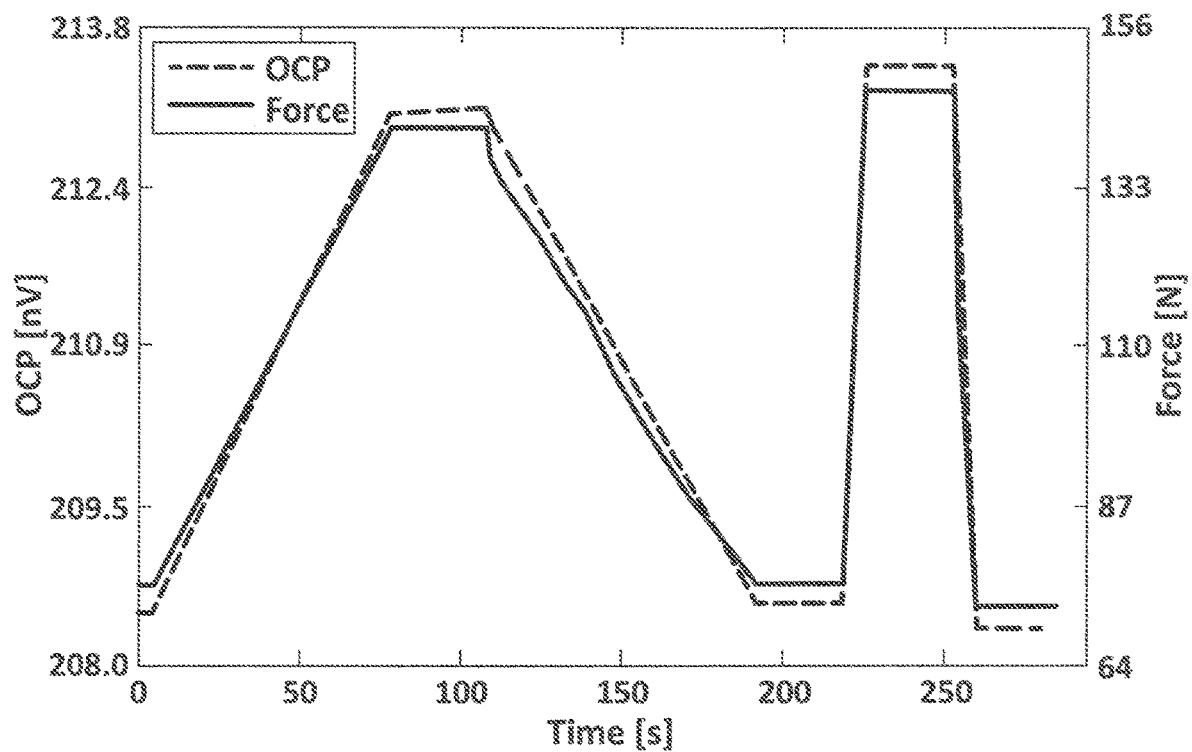
FIG. 4 shows a piezo-chemo-electric effect of the lithiated carbon fibre.
Figure 5:
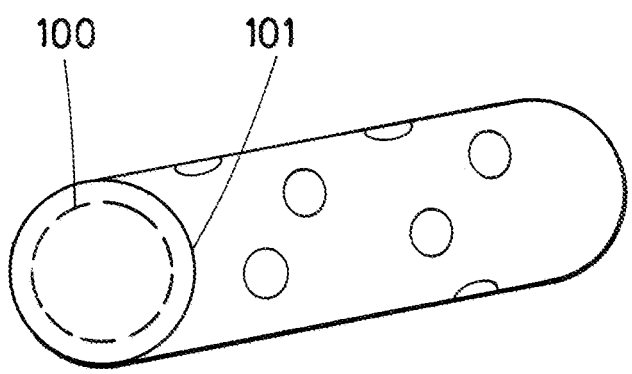
FIG. 5 shows a "swelled" diameter of a lithiated carbon fibre.
Figure 8:
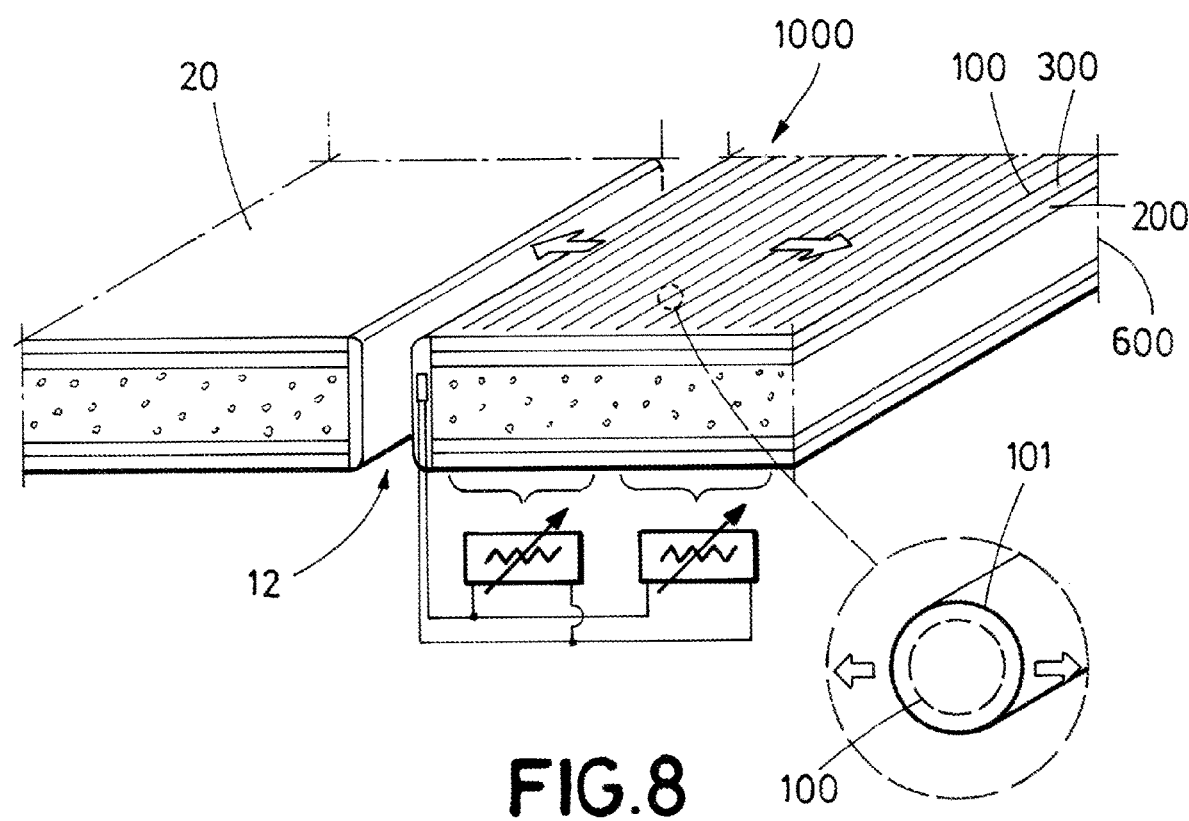
FIG. 8 shows a panel according to the present invention having lithiated carbon fibres oriented transverse to the joint.

FIG. 8 shows the panel (1000) having lithiated carbon fibres (100) oriented transverse (parallel) to the joint (12) between the panel (1000) and the crown lining (20). In this example, two areas in the panel (1000) to the right of the joint (12) comprising lithiated carbon fibres and shown by two opposed diverging arrows, are shown: one closest to the joint (12) and the second farther away. The fibre orientation is similar to an orientation with fibres running across the joint (i.e. perpendicular to the joint (12)), however, due to a large number of fibres, their common effect is not insignificant. In other examples, the lithiated carbon fibres (100) in the layer can be oriented longitudinal (perpendicular) to the joint (12) or a combination thereof. For examples with different fibre directions, the mentioned common effect of the fibres could be added to the "swelling" effect of fibres running across the joint. FIG. 8 shows the expansion direction or "swelling" direction of the lithiated carbon fibres (100) having a swelled diameter (101) as shown in FIG. 5 that causes the panel (1000) to expand and fill the gap.

Even though reference has been made to a specific embodiment of the invention, it is obvious for a person skilled in the art that the panels for a cabin of an aircraft described herein are susceptible to numerous variations and modifications, and that all of the details mentioned can be substituted for other technically equivalent ones without departing from the scope of protection defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A panel for a cabin of an aircraft, the panel includes:
    a laminate comprising a first layer comprising lithiated carbon fibers, a second layer comprising carbon fibers with a cathode lithium coating, and an electrolyte-containing separator interposed between the first and the second layers;
    at least one pressure sensor established on an outer surface of the laminate, and
    a switch configured to regulate a voltage applied to the laminate based on an output of the pressure sensor to expand the panel.

2. The panel according to claim 1, further comprising a microcontroller configured to receive the output of the pressure sensor and actuate the switch.

3. The panel according to claim 2, further comprising a power source providing the applied voltage to the laminate.

4. The panel according to claim 1, wherein the cathode lithium coating comprises $LiFePO_4$.

5. The panel according to claim 1, further comprising foam in the panel.

6. The panel according to claim 5, further comprising a second laminate wherein the foam is sandwiched between the first laminate and the second laminate.

7. A hat-rack for an aircraft comprising the panel according to claim 1.

8. A cabin lining for an aircraft comprising the panel according to claim 1.

9. A method for filing a gap between a panel for a cabin of an aircraft and a cabin element, the first panel comprising a laminate including a first layer of lithiated carbon fibers, a second layer of carbon fibers with a cathode lithium coating, and an electrolyte-containing separator between the first and the second layers,
the method comprising:
detecting whether the gap is closed between the panel and the cabin element with a pressure sensor; and
applying a voltage to the laminate based on an output of the pressure sensor indicative of whether the gap is closed, wherein the voltage applied to the laminate expands the panel to close the gap.

10. The method according to claim 9, further comprising:
detecting a contact between the panel and the cabin element with the pressure sensor; and
terminating the applied voltage in response to the detection of the contact.

11. The method according to claim 9, further comprising:
regulating the applied voltage to the laminate with a switch; and
actuating the switch with a microcontroller receiving the output from the pressure sensor indicating whether or not the gap is closed.

12. The method according to claim 9, further comprising using a battery to supply the voltage for the laminate.

13. The method according to claim 9, further comprising using a second panel as an energy storage for the voltage applied to the laminate.

14. The method according to claim 9, further comprising orienting the lithiated carbon fibers of the laminate transverse to the gap.

15. The method according to claim 9, further comprising orienting the lithiated carbon fibers of the laminate longitudinal to the gap.

16. A panel for a cabin of an aircraft, the panel includes:
a first laminate comprising a first layer comprising lithiated carbon fibers, a second layer comprising carbon fibers coated with cathode lithium, and a first electrolyte-containing separator sandwiched between the first and the second layers;
first set of electrical contacts attached to the first laminate and configured to apply a voltage across the first layer, the second layer and the first electrolyte-containing separator, wherein the voltage expands the panel;
an edge of the panel facing a cabin element adjacent to the panel;
a sensor proximate the edge of the panel and configured to sense whether the edge abuts the cabin element; and
a switch and controller circuit configured to regulate the voltage applied to the first laminate depending on whether the sensor detects abutment between the edge of the panel and the cabin element.

17. The panel of claim 16 further comprising:
a second laminate comprising a third layer comprising lithiated carbon fibers, a fourth layer comprising carbon fibers coated with cathode lithium, and a second electrolyte-containing separator sandwiched between the third and fourth layers;
a second set of electrical contacts attached to the second laminate and configured to apply a voltage across the third laminate, the fourth laminate and the second electrolyte-containing separator; and
a foam layer sandwiched between the first and second laminates.

18. The panel of claim 17 wherein the sensor is a first sensor applied to an edge of the first laminate and the panel further comprises a second sensor applied to an edge of the second laminate,
the switch and controller circuit is configured to regulate the voltage applied to the first laminate depending on whether the first sensor detects abutment between the edge of the panel and the cabin element, and
the switch and controller circuit is configured to regulate the voltage applied to the second laminate depending on whether the second sensor detects abutment between the edge of the panel and the cabin element.

* * * * *